July 10, 1928.
O. WITTEL
1,676,594
MOTION PICTURE MECHANISM
Filed Feb. 17, 1926
FIG. 1.
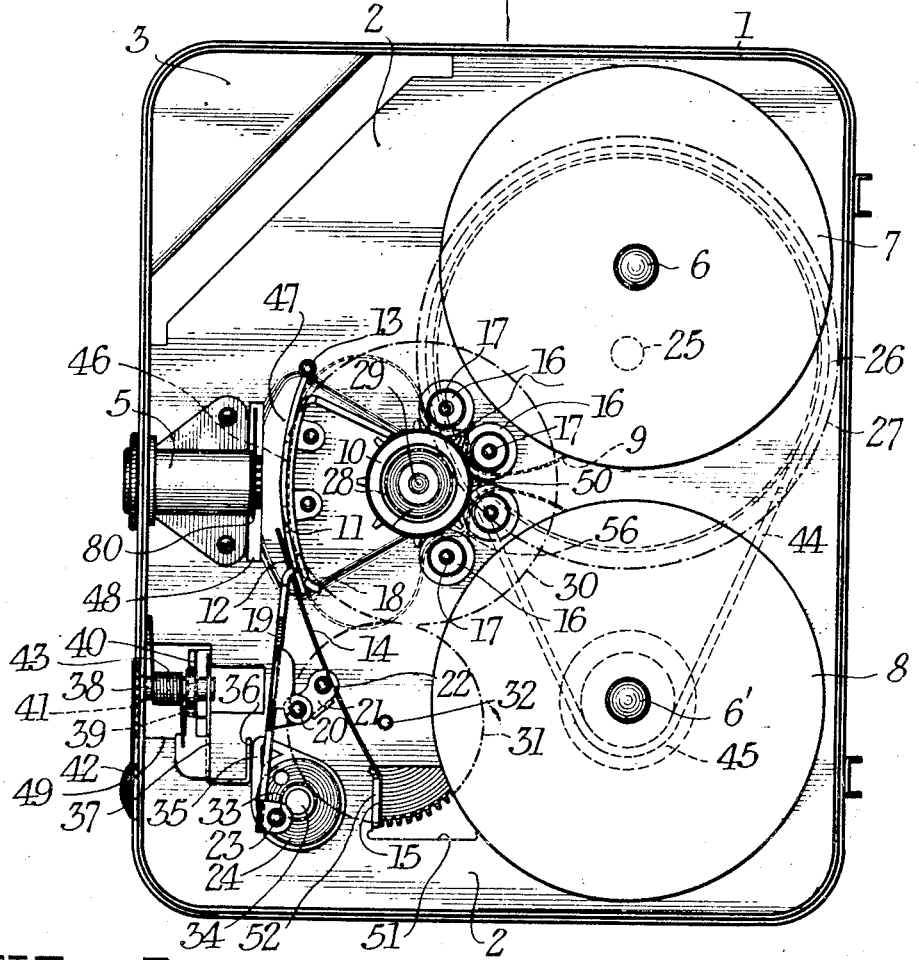
FIG. 2.
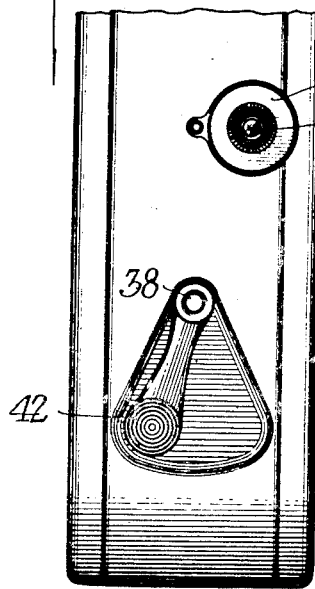
FIG. 3.
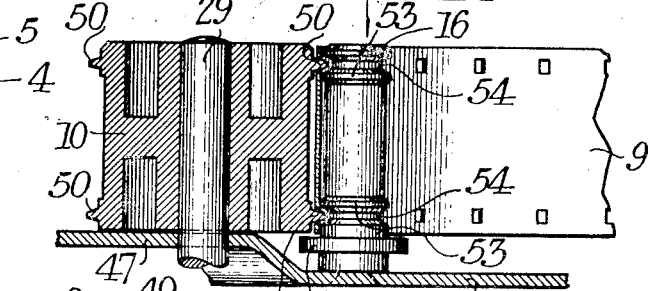
FIG. 4.
INVENTOR,
Otto Wittel,
BY R. L. Stinchfield
H. M. Perrins
ATTORNEYS.

Patented July 10, 1928.

1,676,594

UNITED STATES PATENT OFFICE.

OTTO WITTEL, OF ROCHESTER, NEW YORK, ASSIGNOR TO EASTMAN KODAK COMPANY, OF ROCHESTER, NEW YORK, A CORPORATION OF NEW YORK.

MOTION-PICTURE MECHANISM.

Application filed February 17, 1926. Serial No. 88,791.

This invention relates to a stopping mechanism for motion picture apparatus and is particularly designed so that the parts of the mechanism will always be stopped at a definite desired point in their cycles of operation.

The structure by which this and other desirable objects are attained will be apparent from the following description, the novel features being particularly pointed out in the claims. Reference will now be made to the accompanying drawing wherein the same reference characters designate the same parts throughout and in which Fig. 1 is a side view of a motion picture camera with one side open.

Fig. 2 is a fragmentary front view thereof.

Fig. 3 is a fragmentary view showing the sprocket in section and a presser roll associated therewith.

Fig. 4 is a front view of the tripping mechanism only.

The apparatus chosen to illustrate my invention comprises a small, portable, motion picture camera having a casing 1, within which is a longitudinal partition frame 2, carrying most of the parts shown. A finder casing 3, objective 4 and mount 5 therefor, reel shafts 6 and 6' with reels 7 and 8 thereon, and shutter 80 are shown for the sake of completeness. The film 9 passes from supply reel 7 over a main driving sprocket 10, thence through a curved gate, comprising a fixed rear member 11 and a front member 12 pivoted at 13 and held resiliently in position by a spring 14 affixed at 15 to lug 52 struck up from partition 2, thence back to the sprocket 10 and finally to the take up reel 8. The film is held in place against the sprocket by idle rolls 16 carried by pintle shafts 17 fixed on partition 2. The film is intermittently advanced past the gate by a claw 18 carried by arm 19 pivoted at an intermediate point 20 to a link 21, which is pivoted at 22 to frame 2, the other end of the arm being pivoted at 23 to the driving disc 24.

Mounted behind the partition is a motor and gear mechanism by which these several parts are driven. This mechanism is, for the sake of clearness, indicated by dot and dash lines, showing clearly the operative relation of the several parts. A spring motor is mounted on the main shaft 25, in the customary rotatable casing 26 to which is fixed a main driving gear 27, intermeshing with a gear 28 on the shaft 29 of the sprocket 10. Carried by shaft 29 is a gear 30 meshing with gear 31 on shaft 32, this gear meshing with a pinion 33 on the shaft 34 of disc 24. The proportions of the gears are such that the disc 24 rotates exactly eight times during one rotation of sprocket 10. Since the sprocket has eight pairs of teeth 50, it follows that when the claw 18 has exactly completed one cycle of its path, one pair of sprocket teeth will have turned one-eighth of a revolution and be in the position occupied by the preceding pair of teeth at the beginning of the cycle.

Rigidly connected with disc 24 and its shaft 34 is an extension 35. A spring stop member 36 is mounted to swing in the path of this extension. This stop 36 is carried on an arm 37 mounted on a shaft 38 adapted to oscillate in a bearing 39 carried by a lug 40 on the frame 2. The shaft 38 also extends through and turns in a bearing 41 in the front of casing 1 and carries at its outer end a finger piece 42. A spring 43 normally holds the stop 36 in the path of movement of the extension 35 and the finger piece 42 in the position shown in Fig. 2. Movement of the finger piece to the right removes the stop from the path of the extension, and permits the mechanism to move under the driving force of the spring motor. The stop is held in either position by lug 57 engaging the bands 58 of spring 59.

Around the motor casing 26 is passed a friction belt 44 which also passes around a pulley 45 on the shaft 6' of take up reel.

The pintle shafts 17 are equi-spaced about the shaft 29, by angular distances of forty five degrees, this being also the angle between successive pairs of sprocket teeth 50.

There is also shown a sector shutter of the usual type having a shutter blade 80 adapted to be revolved by pinion 81, concentric therewith, which is driven by suitable gearing, not shown, from the gear train.

The mechanism is so designed and proportioned that when the extension 35 is in its stationary position against stop 36 as shown in Fig. 1, the sprocket teeth 50 will be positioned half way between the shafts 17 and the rolls carried thereby, the shutter blade 80 will be in alignment with the exposure window 46 in the curved gate and the claw 18 will be out of engagement with the film, and at that portion of its cycle where it has just left the film and is about to begin an idle up-stroke perparatory to re-engaging the film. All of these parts are shown in their described positions in Fig. 1.

The partition 2 has a boss 47 struck up therefrom opposite the sprocket and gate, and has suitable apertures 48 for the shutter and 49 for the trigger mechanism. An aperture 51 is also shown, providing material for the lug 52 to which spring 15 is attached. The rolls 16 have flanges 53 providing between them grooves 54 opposite the sprocket teeth 50, and carry annular shoulders 55 extending beneath the periphery of sprocket 10.

The positioning of the sprocket teeth 50 between the rollers 16 is a very useful feature of my invention. In operation the threading of the film is in general the same as is usual in this type of camera, a large loop of film being drawn out from the supply reel and placed in position at the sprocket and gate with its end attached to the take up reel. In placing the loop in position, the central part is slipped edgewise between the gate members, the part 12 readily yielding. Small kinks or bends 56 are formed in the film at the points where it is to pass over the sprocket teeth between the rolls 16, and these are slipped sidewise into position, the shoulders 55 and boss 47 forming stops to position the film correctly. As the teeth are not opposite the rolls, there is no obstacle to this sidewise insertion past the teeth. As soon as the film is inserted and the bends 56 released, the natural elasticity of the film will cause it to seat itself on the sprocket. In practice, the upper bend 56 will be formed, and positioned, the film will then be positioned at the curved gate and then the lower bend 56 will be formed and positioned.

The shoulder is also of use in assembling the parts, since the rolls are loose on their spindles and are held in place by the shoulders which pass beneath the sprocket.

It is obvious that various embodiments of my invention are possible and I contemplate, as included within my invention, all such modifications and equivalents as fall within the scope of the appended claims.

Having thus described my invention, what I claim as new and desire to secure by Letters Patent is:

1. In a motion picture apparatus, a film driving sprocket having a series of equispaced teeth about its periphery, two rolls having a position near the periphery of the sprocket and adapted to hold a perforated band in driving relation with the sprocket, the angular relation of said rolls to the axis of the sprocket being the same as that of two of the teeth of the spocket, mechanism by which the sprocket may be turned and means operative on said mechanism and providing a stop therefor, there being a definite predetermined relation between the stopping means and the mechanism such that one of the teeth will automatically stop in a definite predetermined position between said rolls.

2. In a motion picture apparatus, a film driving sprocket having a series of equispaced teeth, a pair of rolls fixed in position near the sprocket and adapted to hold a perforated film band in driving relation with the sprocket, the angular relation of said rolls to the axis of the sprocket being the same as that of two adjacent teeth of the sprocket, mechanism by which the sprocket may be turned, and releasable means positioned to engage a part of the mechanism and hold it against movement in a definite predetermined relation such that one of the sprocket teeth will be positioned midway between the rolls.

3. In a motion picture apparatus, a film driving sprocket having a series of equispaced teeth about its periphery, a series of rolls fixed in position about the periphery of the sprocket and separated by the same angular distance as are the teeth, and adapted to hold a perforated film band in driving relation with the sprocket, mechanism by which the sprocket may be turned and means operative on said mechanism and providing a stop therefor, there being a definite predetermined relation between the stopping means and the mechanism such that said teeth will automatically stop in positions spaced midway between said rolls.

4. In a motion picture apparatus, adapted for use with a perforated film band, an exposure gate, mechanism including a film driving sprocket having a series of equispaced teeth, means for intermittently engaging and advancing a film past the gate, a shutter adapted to cover and uncover said gate, and means connected to the sprocket, film engaging means and shutter by which they may be operated, a pair of rollers fixed in position near the roller and adapted to hold a film band thereagainst, the angular relation of said rolls to the axis of the sprocket being the same as that of two adjacent teeth of the sprocket, and means opertive on said mechanism and providing a stop therefor, the relation between the stopping means and the mechanism being such that the means will automatically hold the mechanism in a definite predetermined relation, such that the shutter will cover the gate, the film engaging means will be out of engagement therewith and one of the sprocket teeth will be spaced between the rolls.

5. In a motion picture apparatus adapted for use with a perforated film band, an exposure gate, mechanism including a film driving sprocket having a series of equispaced teeth, a film advancing claw having a definite cycle during a part of which it engages and moves a film past the gate and during a part of which it is out of engagement with the film, a shutter adapted to cover and uncover said gate, and a spring motor drivingly connected to said sprocket, claw and shutter, rollers fixed in position about the periphery of the sprocket and separated by the same angular distance as are the teeth, and releasable means adapted to engage a part of the mechanism automatically and thereby hold the mechanism against movement in a definite predetermined relation, such that the shutter will cover the gate, the claw will be out of engagement with the film and the sprocket teeth will be positioned between the rollers.

6. In a motion picture apparatus, a film driving sprocket having a series of equispaced teeth about its periphery, two rolls having a position near the periphery of the sprocket and adapted to hold a perforated band in driving relation with the sprocket, mechanism by which the sprocket may be turned and means operative on said mechanism and providing a stop therefor, the relation between the stopping means and the mechanism being such that one of the teeth will automatically stop in a definite predetermined position between said rolls, said rolls having shoulders adapted to position a film inserted between said rolls and the sprockets.

7. In a motion picture apparatus, adapted for use with a perforated film band, an exposure gate, mechanism including a film driving sprocket having a series of equispaced teeth, a shutter adapted to cover and uncover said gate, and means connected to the sprocket, and shutter by which they may be operated, a pair of rollers fixed in position near the roller and adapted to hold a film band thereagainst, the angular relation of said rolls to the axis of the sprocket being the same as that of two of the teeth of the sprocket, and means operative on said mechanism and providing a stop therefor automatically operative to hold the mechanism in a definite predetermined relation, such that the shutter will cover the gate, and one of the sprocket teeth will be at a definite predetermined position between the rolls.

8. In a motion picture apparatus adapted for use with a perforated film band, an exposure gate, mechanism including a film driving sprocket having a series of equispaced teeth, a shutter adapted to cover and uncover said gate, and a spring motor drivingly connected to said sprocket and shutter, rollers fixed in position about the periphery of the sprocket and separated by the same angular distance as are the teeth, and releasable means automatically operative to engage a part of the mechanism and thereby hold the mechanism against movement in a definite predetermined relation, such that the shutter will cover the gate and the sprocket teeth will be positioned between the rollers.

Signed at Rochester, New York this 12th day of February, 1926.

OTTO WITTEL.